United States Patent [19]

Iacovangelo et al.

[11] Patent Number: 4,548,877

[45] Date of Patent: Oct. 22, 1985

[54] ELECTROLYTE RESERVOIR FOR CARBONATE FUEL CELLS

[75] Inventors: Charles D. Iacovangelo, Schenectady, N.Y.; David A. Shores, Minneapolis, Minn.

[73] Assignee: The United States of America as represented by the United States Department of Energy, Washington, D.C.

[21] Appl. No.: 612,951

[22] Filed: May 23, 1984

[51] Int. Cl.[4] .......................... H01M 4/88; H01M 8/14
[52] U.S. Cl. ..................................... 429/41; 29/623.1; 429/44
[58] Field of Search ........................ 429/16, 41, 46, 44; 29/623.1

[56] References Cited

U.S. PATENT DOCUMENTS

| 3,481,788 | 12/1969 | Hamlen et al. | 429/41 |
| 4,242,426 | 12/1980 | Arendt | 429/193 |
| 4,247,604 | 1/1981 | Marianowski et al. | 429/81 |
| 4,317,865 | 3/1982 | Trocciola et al. | 429/44 |
| 4,361,631 | 11/1983 | Iacovangelo et al. | 429/40 |

*Primary Examiner*—Donald L. Walton
*Attorney, Agent, or Firm*—Hugh W. Glenn; Robert J. Fisher; Judson R. Hightower

[57] ABSTRACT

An electrode for a carbonate fuel cell and method of making same wherein a substantially uniform mixture of an electrode-active powder and porous ceramic particles suitable for a carbonate fuel cell are formed into an electrode with the porous ceramic particles having pores in the range of from about 1 micron to about 3 microns, and a carbonate electrolyte is in the pores of the ceramic particles.

20 Claims, No Drawings

ELECTROLYTE RESERVOIR FOR CARBONATE FUEL CELLS

CONTRACTUAL ORIGIN OF THE INVENTION

The United States Government has rights in this invention pursuant to Contract No. DE-AC02-80ET17019 between the U.S. Department of Energy and General Electric Company.

BACKGROUND OF THE INVENTION

The present invention relates to an electrolyte reservoir for use in molten carbonate fuel cells and to methods of preparing such a structure.

Generally, molten carbonate fuel cells are comprised of a cathode, an anode, and an electrolyte structure disposed between the cathode and the anode. The electrolyte structure is composed of carbonate electrolyte in a supporting matrix. Under fuel cell operating conditions, at temperatures usually in the range of about 500° C. to about 700° C., the supporting matrix acts to retain, via capillary action, the electrically active molten carbonate between the cell electrodes, thereby alleviating the need to physically anchor the electrodes as rigidly as would be required with a pure electrolyte system.

One of the principal problems facing the development of carbonate fuel cells is how and where to store sufficient electrolyte to maintain adequate performance over the cell life which may be 40,000 to 50,000 hours. During cell operation electrolyte is lost by several processes, such as vapor transport or reaction with cell components. One state of the art cell design employs the use of a thick tile between the anode and the cathode in which to store sufficient electrolyte to maintain required performance during the cell life. However, cells with such thick tiles suffer from high IR losses. Another concept currently being evaluated is the use of a relatively thin matrix for the electrolyte between the anode and the cathode with the required excess electrolyte being stored in the electrodes. This concept results in flooding the electrode with electrolyte which increased the internal resistance of the cell and degrades performance. Another problem with both concepts is that as electrolyte is lost from the matrix, porosity of the matrix develops which itself contributes to increased cell resistance and if the porosity becomes interconnected, anode and cathode gases can mix, which seriously reduces cell performance. An additional problem is that as the matrix becomes more porous the structure is weakened and can crack, again leading to cross leaks.

SUMMARY OF THE INVENTION

This invention relates to an electrode for a carbonate fuel cell which also functions as a reservoir for electrolyte by storing the electrolyte therein in discrete portions or islands within the electrode.

An important object of the present invention is to provide an electrode for a carbonate fuel cell which acts as a reservoir for electrolyte sufficient to maintain adequate performance over 40,000 hours of cell life.

Another object of the present invention is to provide an electrode for a carbonate fuel cell comprising an electrode-active material with a plurality of discrete portions of electrolyte dispersed therein.

Another object of the present invention is to provide an electrode for a carbonate fuel cell comprising a substantially uniform mixture of an electrode-active powder and porous ceramic particles suitable for a carbonate fuel cell shaped to form a electrode, the porous ceramic particles having pores in the range of from about 1 micron to about 3 microns, and a carbonate electrolyte in the pores of the ceramic particles.

A final object of the present invention is to provide a method of making an electrode for a carbonate fuel cell comprising forming a ceramic powder suitable for use in a carbonate fuel cell into porous particles having mean diameters not less than about 30 mils, the porous particles having pores with mean diameters in the range of from about 1 to about 3 microns, mixing the porous particles with a powder electrode-active material and mean diameters in the range of from about 4 to about 9 microns to form a homogenous mixture, sintering the mixture under a protective atmosphere for a time sufficient to form a rigid matrix, and introducing a carbonate electrolyte into the matrix preferentially into the porous particles.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE INVENTION

The inventive electrode herein described is a new structure which pours electrolyte in discrete portion within the electrode by utilizing the capillary forces and controlling the pore size both in the bulk electrode and in the adjacent matrix supporting electrolyte. For instance it is common in molten carbonate fuel cells to provide a matrix for an electrolyte utilizing various ceramics such as lithium aluminate, α-alumina, strontium titanate, mixtures thereof, all as set forth in U.S. Pat. No. 4,242,426 issued Dec. 30, 1980 to Arendt for PROCESS FOR ELECTROLYTE STRUCTURE WITH STRONTIUM TITANATE MATRIX FOR MOLTEN CARBONATE FUEL CELLS, the disclosure of which is incorporated herein by reference. Also, it is common in the carbonate fuel cell art to provide electrodes of sintered metal or ceramic particles electrolessly plated with copper or nickel and thereafter sintered into a self-supported matrix, all disclosed in U.S. Pat. No. 4,361,631 issued Nov. 30, 1982 to Iacovangelo et al. for ELECTRODE MATERIAL FOR MOLTEN CARBONATE FUEL CELLS, the disclosure of which is incorporated herein by reference.

With respect to the electrolyte storing matrix, it is common, as taught in the aforesaid '426 patent, to provide a matrix wherein the pore sizes are in the range of from about 0.1 micron to about 0.7 micron with the preferred pore sizes being in the range of about 0.3 micron to about 0.4 micron. As seen in the '631 patent, it is also common to provide electrodes for carbonate fuel cells wherein the pore sizes of the electrode range from about 0.1 micron to about 20 microns with a preferred range being in the area of from 2 to 10 microns.

This invention resides in the discovery that by selecting appropriate pore sizes for both the electrolyte matrix and the electrode, it is possible to store electrolyte in the electrode for later use in the cell as electrolyte is lost without encountering the increased cell resistance hereinbefore described. By using a relatively thin electrode as a reservoir for electrolyte, several of the hereinbefore mentioned problems are obviated. The critical aspect of the invention is constructing the reservoir pores in the electrode larger than the pores in the electrolyte matrix but smaller than the bulk of the pores in the electrode, to preferentially introduce the electrolyte into the preselected reservoir pores in the electrode to have the electrolyte available as make-up electrolyte during operation of the cell. For instance, if the pore size of the electrolyte matrix is on the order of 0.3 to 0.7 microns and the pore size of the bulk of the pores in the electrode are on the order of 4 to 9 microns, then the pore size for the electrolyte reservoir preferably is in the 1 to 3 micron range. If the reservoir pores are too small, the electrolyte will not leech out when needed and if the reservoir pores are too large, the electrolyte will not preferentially store therein. Accordingly, this aspect of the invention is critical. A significant advantage over the prior art for the subject invention is the thinness of the electrodes which can be fabricated, thereby reducing cell resistance. For instance, it is possible with the subject invention to construct electrode structures as thin as 10 to 20 mils with a preferred thickness being in the range of from about 30 mils to about 60 mils.

In preparing an electrode according to the method of the present invention, the starting materials can be those described in the aforementioned '631 patent. For instance, nickel or copper plated strontium titanate particles having a mean diameter in the range of from about 1 micron to about 3 microns are introduced into a ball mill along with a suitable organic binder and media but with no grinding media. After operation of the ball mill for a period of time the micron size particles agglomerate into small porous spheres approximately 30 mils in diameter; longer mixing times result in large sized particles. These spheres are thereafter uniformly mixed with an electrode-active material generally in the form of a powder having mean diameter in the 4 to 9 micron range. For an anode, nickel 255 produced by Inco, a nickel product which is in the form of flake approximately 2 microns wide by 6 microns long may be used or electroless copper or nickel plated ceramic particles having mean diameters in the range of about 4 to about 9 microns. The amount of electrode-active material present in the electrode may vary over a wide range of from about 50 to 80 volume percent of the solids of the electrode, but preferably in the 65 to 80 volume percent range. After mixing, the two types of particles are deposited on an appropriate substrate such as graphite, shimmed with Grafoil, as is well known, and thereafter sintered at temperatures in the range of from about 800° C. to about 1000° C. under a protective atmosphere such as argon, hydrogen or in a vacuum. The reservoir for the electrolyte is formed by the pores of the agglomerated 1 micron to 3 micron particles which after agglomeration into porous spheres of 30 to 60 mils diameter have pores of about 1 to 3 microns. The remainder of the electrode has pores in the range of from about 4 to 10 microns.

Electrolyte suitable for the present invention is selected from alkali metal carbonates and particularly the binary mixtures of $Li_2CO_3$—$K_2CO_3$; $Li_2CO_3$—$Na_2CO_3$; $Na_2CO_3$—$K_2CO_3$; and the tertiary mixture $Li_2CO_3$—$Na_2CO_3$—$K_2CO_3$. Electrolyte is loaded into the formed electrode matrix by depositing solid electrolyte onto the formed electrode and heating to a temperature slightly above the liquidus temperature of the electrolyte which causes the electrolyte to melt and to flow preferentially into the reservoir pores. Because of the capillary action of the electrode, the electrolyte preferentially flows into the 1 to 3 micron size pores leaving the larger 4 to 10 micron size pores open and available for gas transport to the electrochemically active areas of the electrode. It is clear that the reservoir pores must fit within a relatively narrow size range, larger than the electrolyte matrix but smaller than the bulk of the electrode matrix.

Although the agglomerated particles are generally in the range of from about 30 mils to about 60 mils, the electrode of the present invention may be fabricated with a thickness in the range of from about 10 mils to about 250 mils. Thin electrodes of less than 100 mils are preferred due to increased IR losses with thick electrodes; the only criteria for the electrodes is that they are thick enough to be self-supporting and to that end electrodes in the 10 mil to 60 mil range are preferred.

This invention has several advantages over state-of-the art processes for storing electrolyte. First, the matrix need be only thick enough to be fabricable (0.010–0.020"), which greatly decreases cell resistance, so long as the cell reactions occur close to the matrix. Second, since gas diffusion is quite fast, the presence of the stored electrolyte are not expected to degrade performance of the electrodes. Third, since the overall dimensions of the electrodes are similar to state-of-the art, the new electrode structure can be readily incorporated into present cell designs.

It should be understood that the subject invention is applicable to both the anode and cathode. By using nickel or copper plated ceramics, as taught in the prior art, the particular pore size required can be produced. An added advantage of using the electroless plated material is that as electrolyte is lost from the pore the exposed material would be electrochemically active for the anode reaction. Also, since this powder is electronically conductive, it would not decrease the anode conductivity. In addition, the electroless plated material can be sintered to the existing state-of-the art anode which should therefore not affect the strength of the anode.

For the cathode, however, owing to its lower conductivity and slower kinetics, less electrolyte may be needed than in the anode to make more bulk electrode available for reaction sites.

While there have been described what at present are considered to be the preferred embodiments of the invention, it will be understood that various modifications may be made therein, and it is intended to cover in the appended claims all such modifications as fall within the true spirit and scope of the invention.

We claim:

1. An electrode for a carbonate fuel cell comprising an electrode-active material with a plurality of discrete portions of electrolyte dispersed therein, wherein the electrolyte is stored in porous ceramic particles uniformly mixed with said electrode-active material.

2. The electrode of claim 1, wherein the electrode-active material is present in the range of from about 65 to about 80 percent by volume of the solids of the electrode.

3. The electrode of claim 1, wherein said electrode is in the form of a sheet having a thickness between 10 and 250 mils.

4. The electrode of claim 3, wherein said electrode thickness is less than about 100 mils.

5. The electrode of claim 1, wherein said electrolyte is an alkali metal carbonate is selected from the binary mixtures of $Li_2CO_3$—$K_2CO_3$; $Li_2Co_3$—$Na_2CO_3$; $Na_2CO_3$—$K_2CO_3$ or the tertiary mixture $Li_2CO_3$—$Na_2CO_3$—$K_2CO_3$.

6. The electrode of claim 1, wherein the pore size of said porous ceramic particles is in the range of from about 1 micron to about 3 microns.

7. The electrode of claim 1, wherein the ceramic particles are selected from lithium aluminate, $\alpha$-alumina, strontium titanate and mixtures thereof.

8. The electrode of claim 7, wherein the ceramic is plated with nickel, copper or mixtures thereof.

9. An electrode for a carbonate fuel cell comprising a substantially uniform mixture of an electrode-active powder and porous ceramic particles suitable for a carbonate fuel cell shaped to form an electrode, said porous ceramic particles having pores in the range of from about 1 micron to about 3 microns, and a carbonate electrolyte in the pores of said ceramic particles.

10. The electrode of claim 9, wherein said electrode-active powder has mean diameters in the range of from about 4 microns to about 9 microns and is selected from the class consisting of nickel, copper, ceramic encapsulated with nickel or copper and mixtures thereof.

11. The electrode of claim 10, wherein said electrode-active powder is present in the range of from about 50 percent by volume to about 80 percent by volume of the solids of the electrode.

12. The electrode of claim 9, wherein said ceramic particles are substantially spherical having mean diameters in the range of from about 30 mils to about 60 mils and are agglomerated ceramic powders.

13. The electrode of claim 12 wherein said electrolyte is in the form of a sheet having a thickness in the range of from about 10 mils to about 60 mils.

14. A carbonate fuel cell including a porous electrode and a porous electrolyte matrix, said porous electrode having reservoir pores containing discrete quantities of electrolyte therein and bulk pores in said electrode, said bulk pores being larger than said reservoir pores, said pores in said porous electrolyte matrix being smaller than said reservoir pores.

15. A method of making an electrode for a carbonate fuel cell comprising forming a ceramic powder of about 1 micron mean diameter suitable for use in a carbonate fuel cell into porous particles having mean diameters not less than about 30 mils, the porous particles having pores with mean diameters in the range of from about 1 to about 3 microns, mixing the porous particles with a powder electrode-active material with mean diameters in the range of from about 4 to about 9 microns to form a homogenous mixture, sintering the mixture under a protective atmosphere for a time sufficient to form a rigid matrix, and introducing a carbonate electrolyte into said matrix preferentially into the porous particles.

16. The method of claim 15, wherein the ceramic powder is selected from lithium aluminate, $\alpha$-alumina, strontium titanate and mixtures thereof.

17. The method of claim 15, wherein the electrode-active material contains nickel or copper and is present in the range of from about 65 to about 80 percent by volume of the solids of the electrode.

18. The method of claim 15, wherein the electrolyte is selected from the binary mixtures of $Li_2CO_3$—$K_2CO_3$; $Li_2CO_3$—$Na_2CO_3$; $Na_2CO_3$—$K_2CO_3$ or the tertiary mixture $Li_2CO_3$—$Na_2CO_3$—$K_2CO_3$.

19. The method of claim 15, wherein the mixture is formed into a thin sheet and sintered at a temperature of about 1000° C. for a period of about 1 hour, the sheet having a thickness in the range of from about 10 mils to about 100 mils.

20. The method of claim 15, wherein the carbonate electrolyte is introduced by loading solid electrolyte onto the rigid matrix and heating to a temperature slightly higher than the liquidus temperature of the electrolyte until the electrolyte melts into the porous particles.

* * * * *